United States Patent
Georgin et al.

(10) Patent No.: US 11,505,173 B2
(45) Date of Patent: Nov. 22, 2022

(54) SYSTEMS AND METHODS FOR BRAKE HEALTH MONITORING

(71) Applicant: GOODRICH CORPORATION, Charlotte, NC (US)

(72) Inventors: Marc Georgin, Dayton, OH (US); Paul R. Burte, Clayton, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 319 days.

(21) Appl. No.: 16/818,117

(22) Filed: Mar. 13, 2020

(65) Prior Publication Data
US 2021/0284120 A1    Sep. 16, 2021

(51) Int. Cl.
| B60T 17/22 | (2006.01) |
| B64F 5/60 | (2017.01) |
| B64C 25/44 | (2006.01) |
| B64D 45/00 | (2006.01) |

(52) U.S. Cl.
CPC ............ B60T 17/221 (2013.01); B64C 25/44 (2013.01); B64D 45/00 (2013.01); B64F 5/60 (2017.01); *B60T 2240/00* (2013.01); *B64D 2045/0085* (2013.01)

(58) Field of Classification Search
CPC .. B60T 17/221; B60T 2240/00; B60T 8/1703; B64C 25/44; B64C 25/42; B64D 45/00; B64D 2045/0085; B64F 5/60
See application file for complete search history.

(56) References Cited

U.S. PATENT DOCUMENTS

| 6,223,115 | B1 | 4/2001 | Batistic |
| 8,590,985 | B2 | 11/2013 | Cahill |
| 10,800,392 | B2 * | 10/2020 | Alam ..................... B60T 17/22 |
| 2002/0108797 | A1 | 8/2002 | Urban et al. |
| 2009/0198408 | A1 * | 8/2009 | Salman ............. B60W 50/0205 |
| | | | 701/29.2 |
| 2009/0276133 | A1 | 11/2009 | May et al. |
| 2012/0053784 | A1 * | 3/2012 | Schmidt ................. G01G 19/07 |
| | | | 701/33.4 |

(Continued)

FOREIGN PATENT DOCUMENTS

| CN | 102556340 | 3/2014 |
| CN | 106394881 | 8/2018 |

(Continued)

OTHER PUBLICATIONS

European Patent Office, European Search Report dated Jul. 20, 2021 in Application No. 21161607.3.

*Primary Examiner* — Russell Frejd
(74) *Attorney, Agent, or Firm* — Snell & Wilmer L.L.P.

(57) ABSTRACT

A method for brake health monitoring may include sending, by a brake control unit (BCU), a brake command signal to initiate a braking maneuver, and receiving a first wheel speed signal and a second wheel speed signal corresponding to the speed of first and second wheels, respectively, during the braking maneuver. The BCU may detect that the speed of the first wheel is greater than the speed of the second wheel by a predetermined threshold, and, in response thereto, post an alert indicating a failure in a brake control component associated with the first wheel based upon the detection of the speed of the first wheel being greater than the speed of the second wheel by the predetermined threshold.

20 Claims, 4 Drawing Sheets

(56) References Cited

U.S. PATENT DOCUMENTS

| | | | | |
|---|---|---|---|---|
| 2017/0008503 | A1* | 1/2017 | Romana | B60T 8/172 |
| 2017/0217419 | A1* | 8/2017 | Yen | B60T 7/042 |
| 2018/0297573 | A1* | 10/2018 | Alam | F16D 66/02 |
| 2018/0370519 | A1* | 12/2018 | Yen | G07C 5/0816 |
| 2021/0049445 | A1* | 2/2021 | Bielby | G06N 3/049 |

FOREIGN PATENT DOCUMENTS

| | | |
|---|---|---|
| DE | 68922977 | 12/1995 |
| EP | 3115266 | 1/2017 |
| EP | 3190017 | 7/2017 |
| EP | 3459798 | 3/2019 |
| EP | 3659877 | 6/2020 |

* cited by examiner

SYSTEMS AND METHODS FOR BRAKE HEALTH MONITORING

FIELD

In general, the arrangements disclosed herein relate to braking systems and methods. More specifically, they relate to systems and methods for brake health monitoring.

BACKGROUND

Aircraft, and various other types of vehicles, typically include a braking system operatively coupled to the wheels of the aircraft and configured to slow the wheels, and the aircraft, during, for example, landing or a rejected takeoff. Aircraft braking systems tend to utilize aircraft brake controllers, to control various aspects of the braking system. One method of monitoring brake health includes detecting a temperature of a brake assembly. For example, during aircraft landing or rejected takeoff, the brakes convert a large amount of kinetic energy to internal energy causing the temperature of the brake disks to rise. Thus, detection of a rise in temperature of the brakes may indicate that the brakes are functioning properly. Another method of monitoring brake health is physically inspecting the brakes. For example, ground crew may physically inspect brake components between flights.

SUMMARY

A method for brake health monitoring is disclosed, comprising sending, by a brake control unit (BCU), a brake command signal to initiate a braking maneuver, receiving, by the BCU, a first wheel speed signal corresponding to a speed of a first wheel during the braking maneuver, receiving, by the BCU, a second wheel speed signal corresponding to a speed of a second wheel during the braking maneuver, and detecting, by the BCU, that the speed of the first wheel is greater than the speed of the second wheel by greater than a predetermined threshold. The BCU may be configured to output a health status indicating a failure in a brake control component associated with the first wheel based upon detection of the speed of the first wheel being greater than the speed of the second wheel by greater than the predetermined threshold.

In various embodiments, the first wheel speed signal is received from a first wheel speed sensor associated with the first wheel and the second wheel speed signal is received from a second wheel speed sensor associated with the second wheel.

In various embodiments, the method further comprises receiving, by the BCU, a third wheel speed signal corresponding to a speed of a third wheel during the braking maneuver, and detecting, by the BCU, that the speed of the first wheel is greater than an average speed of the second wheel and the third wheel by greater than the predetermined threshold.

In various embodiments, the BCU is configured to output the health status indicating the failure in the brake control component associated with the first wheel based upon detection of the speed of the first wheel being greater than the average speed of the second wheel and the third wheel by greater than the predetermined threshold.

In various embodiments, the BCU is further configured to compare a first deceleration of the first wheel with a second deceleration of the second wheel.

In various embodiments, the BCU is configured to output the health status indicating the failure in the brake control component associated with the first wheel in response to the deceleration of the first wheel being greater than the deceleration of the second wheel by a predetermined threshold.

In various embodiments, the speed of the first wheel comprises a first average speed of the first wheel and the speed of the second wheel comprises a second average speed of the second wheel.

A brake health monitoring system is disclosed, comprising a brake control unit (BCU) having a processor, and a tangible, non-transitory memory configured to communicate with the processor, the tangible, non-transitory memory having instructions stored thereon that, in response to execution by the processor, cause the BCU to perform operations comprising sending, by the BCU, a brake command signal to initiate a braking maneuver, receiving, by the BCU, a first wheel speed signal corresponding to a speed of a first wheel during the braking maneuver, receiving, by the BCU, a second wheel speed signal corresponding to a speed of a second wheel during the braking maneuver, and detecting, by the BCU, that the speed of the first wheel is greater than the speed of the second wheel by greater than a predetermined threshold. The BCU may be configured to output a health status indicating a failure in a brake control component associated with the first wheel based upon detection of the speed of the first wheel being greater than the speed of the second wheel by greater than the predetermined threshold.

In various embodiments, the instructions cause the BCU to perform further operations comprising receiving, by the BCU, a third wheel speed signal corresponding to a speed of a third wheel during the braking maneuver, and detecting, by the BCU, that the speed of the first wheel is greater than an average speed of the second wheel and the third wheel by greater than the predetermined threshold.

In various embodiments, the BCU is configured to output the health status indicating the failure in the brake control component associated with the first wheel based upon detection of the speed of the first wheel being greater than the average speed of the second wheel and the third wheel by greater than the predetermined threshold.

In various embodiments, the first wheel speed signal is received from a first wheel speed sensor associated with the first wheel and the second wheel speed signal is received from a second wheel speed sensor associated with the second wheel.

In various embodiments, the BCU is further configured to compare a first deceleration of the first wheel with a second deceleration of the second wheel.

In various embodiments, the BCU is configured to output the health status indicating the failure in the brake control component associated with the first wheel in response to the deceleration of the first wheel being greater than the deceleration of the second wheel by a predetermined threshold.

In various embodiments, the speed of the first wheel comprises a first average speed of the first wheel and the speed of the second wheel comprises a second average speed of the second wheel.

A brake health monitoring system is disclosed, comprising a brake control unit (BCU), a first wheel speed sensor in electronic communication with the BCU, the first wheel speed sensor configured to detect a first wheel speed corresponding to a first wheel, and a second wheel speed sensor in electronic communication with the BCU, the second wheel speed sensor configured to detect a second wheel speed corresponding to a second wheel, wherein the BCU is configured to detect a difference between the first wheel speed and the second wheel speed, and output a health status indicating a failure in a brake control component associated with the first wheel in response to the difference being greater than the predetermined threshold.

In various embodiments, the BCU is further configured to compare a first deceleration of the first wheel with a second deceleration of the second wheel.

In various embodiments, the deceleration of the first wheel speed comprises a first average deceleration of the first wheel and the deceleration of the second wheel comprises a second average deceleration of the second wheel.

In various embodiments, the BCU is configured to output the health status indicating the failure in the brake control component associated with the first wheel in response to the deceleration of the first wheel being greater than the deceleration of the second wheel by a predetermined threshold.

In various embodiments, the first wheel speed comprises a first average speed of the first wheel and the second wheel speed comprises a second average speed of the second wheel.

In various embodiments, the first wheel speed and the second wheel speed are measured during a braking maneuver.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The accompanying drawings illustrate various embodiments employing the principles described herein and are a part of this specification. The illustrated embodiments are meant for description only, and they do not limit the scope of the claims, and in which:

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein described without departing from the scope and spirit of the disclosure. Thus, the detailed description herein is presented for purposes of illustration only and not of limitation.

Provided herein, according to various embodiments, are systems and methods for brake health monitoring, such as within a braking system of an aircraft. While numerous details are included herein pertaining to aircraft components, such as brake components, the systems and methods disclosed herein can be applied to any vehicle that includes a braking system.

Methods for detecting latent brake failure of the present disclosure are particularly useful when a vehicle, such as an aircraft, is traveling straight such that all of the wheel speeds are expected to be equal or nearly equal. In this regard, systems and methods of the present disclosure may operate under the assumption that the vehicle is traveling straight during a braking maneuver in accordance with various embodiments.

A brake monitoring system of the present disclosure may continuously monitor wheel speed signals from the respective wheels during a braking maneuver and compare them with one other. In the absence of failures, all wheel speed signals exhibit the same or very similar speed within a predetermined tolerance as they are slipping a similar magnitude based on a near equivalent pressure applied to the various brakes. In the presence of a brake failure as described herein, one wheel may be essentially free rolling without slip. Methods of the present disclosure detect the failed brake as the associated wheel speed value exhibits a different slip behavior than the non-failed wheel/brake assemblies. In various embodiments, a constant threshold may be defined to detect a wheel speed outlier. In response to such an outlier being detected, the potential failed brake condition causes an alert to be recorded. In various embodiments, in response to the failed condition persisting for a preset time, a failed brake message may be reported, for example to a cockpit or remote terminal, as an indication of needful maintenance. In various embodiments, a deceleration comparison of the wheels may also be used. As seen from the wheel speed signals in FIG. 4, if a wheel is free rolling, its deceleration is greater than the braked wheels during a braking maneuver. In various embodiments, the systems and methods of the present disclosure may be applied irrespective of antiskid application.

Figure 1:
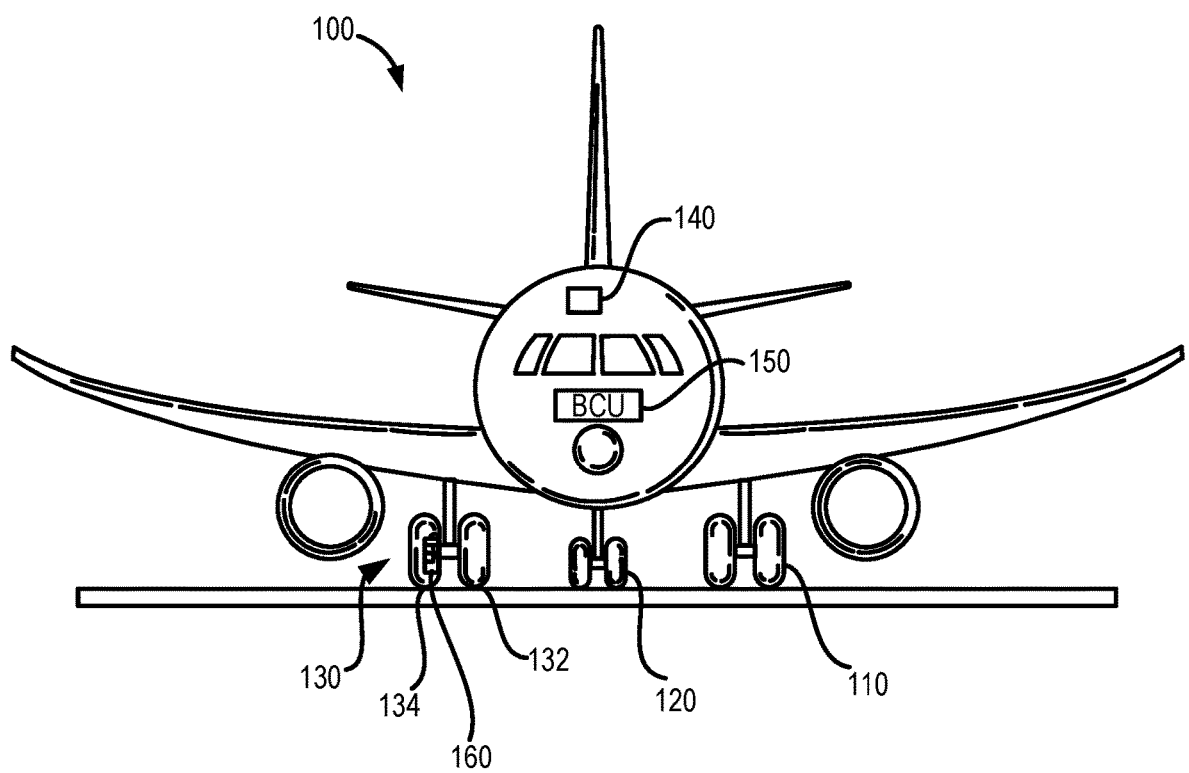
FIG. 1 illustrates an aircraft having multiple landing gear and brakes, in accordance with various embodiments.

Referring now to FIG. 1, an aircraft 100 includes multiple landing gear systems, including a first landing gear 110, second landing gear 120, and third landing gear 130. The first landing gear 110, second landing gear 120, and third landing gear 130 each include one or more wheel assemblies. For example, the third landing gear 130 includes an inner wheel assembly 132 and an outer wheel assembly 134. The first landing gear 110, second landing gear 120, and third landing gear 130 support the aircraft 100 when the aircraft 100 is not flying, thereby allowing the aircraft 100 to take off, land, and taxi without damaging the aircraft 100. In various embodiments, the second landing gear 120 is also a nose landing gear for the aircraft 100, and oftentimes, one or more of the first landing gear 110, second landing gear 120, and third landing gear 130 are operationally retractable into the aircraft 100 when the aircraft 100 is in flight and/or airborne.

In various embodiments, the aircraft 100 further includes an avionics unit 140, which includes one or more controllers (e.g., processors) and one or more tangible, non-transitory memories capable of implementing digital or programmatic logic. In various embodiments, for example, the one or more controllers are one or more of a general purpose processor, digital signal processor (DSP), application specific integrated circuit (ASIC), field programmable gate array (FPGA), or other programmable logic device, discrete gate, transistor logic, or discrete hardware components, or any various combinations thereof or the like. In various embodiments, the avionics unit 140 controls, at least various parts of, the flight of, and operation of various components of, the aircraft 100. For example, the avionics unit 140 controls various parameters of flight, such as an air traffic management systems, auto-pilot systems, auto-thrust systems, crew alerting systems, electrical systems, electronic checklist systems, electronic flight bag systems, engine systems flight control systems, environmental systems, hydraulics systems, lighting systems, pneumatics systems, traffic avoidance systems, trim systems, and the like.

In various embodiments, the aircraft 100 further includes a BCU 150. The BCU 150 includes one or more controllers (e.g., processors) and one or more tangible, non-transitory memories capable of implementing digital or programmatic logic. In various embodiments, for example, the one or more controllers are one or more of a general purpose processor, DSP, ASIC, FPGA, or other programmable logic device, discrete gate, transistor logic, or discrete hardware components, or any various combinations thereof or the like, and the one or more memories store instructions that are implemented by the one or more controllers for performing various functions, such as brake control and/or brake health monitoring, as will be discussed herein. In various embodiments, the BCU 150 controls, at least various parts of, the braking of the aircraft 100. For example, the BCU 150 controls various parameters of braking, such as manual brake control, automatic brake control, antiskid control, locked wheel protection, touchdown protection, park capability, gear retraction braking, and the like. The BCU 150 may further include hardware capable of performing various logic using discrete power signals received from various aircraft systems.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Referring again more particularly to FIG. 1, the aircraft 100 further includes one or more brakes coupled to each wheel assembly. For example, a brake 160 is coupled to the outer wheel assembly 134 of the third landing gear 130 of the aircraft 100. In operation, the brake 160 applies a braking force to the outer wheel assembly 134 upon receiving a brake command, such as from the BCU 150. In various embodiments, the outer wheel assembly 134 of the third landing gear 130 of the aircraft 100 comprises any number of wheels.

Figure 2:
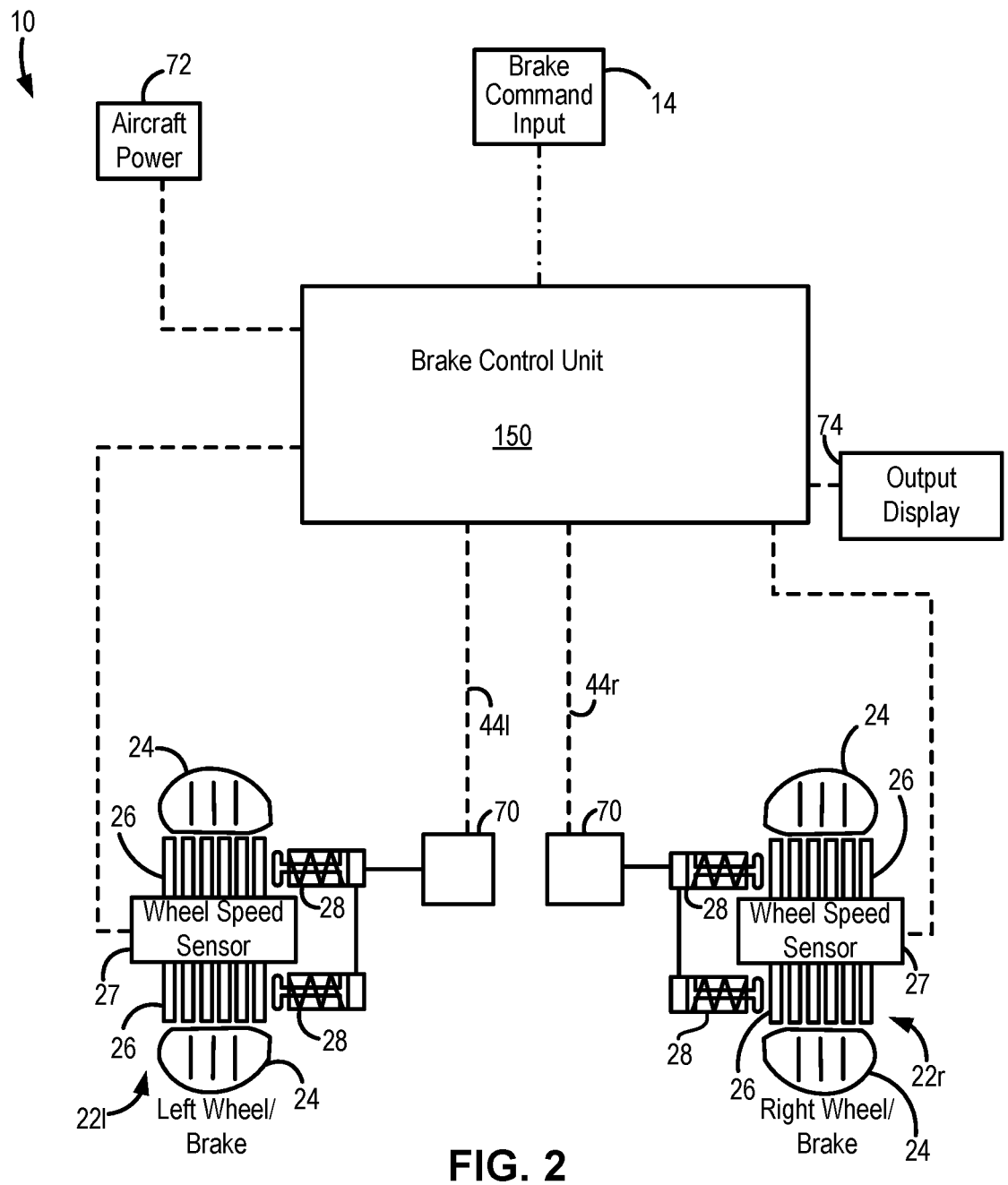
FIG. 2 illustrates a functional diagram of a brake health monitoring system of the aircraft of FIG. 1, in accordance with various embodiments.

Referring now also to FIG. 2, including with continued reference to FIG. 1, a braking system 10 is shown in accordance with various embodiments. The braking system 10 includes the brake control unit (BCU) 150 of FIG. 1, which is programmed to control the various braking functions described herein. In various embodiments, the braking system 10 enables the aircraft 100 to brake, thereby slowing aircraft 100 when on the ground. However, it will be appreciated that the braking system 10 may also be used in connection with other types of vehicles without departing from the scope of the inventive arrangements.

In various embodiments, the braking system 10 further includes an output device and/or output display 74 coupled to the BCU 150. The output device and/or output display 74 is configured to communicate information to the pilot, co-pilot, and/or maintenance crew relating to the braking operations. For example, in various embodiments, the output device and/or output display 74 includes a display, a speaker, a network access device, and/or the like that sends a message to a remote terminal, or the like. In various embodiments, the BCU 150 controls the output device and/or output display 74 to output the health status of the braking system 10, including the various components thereof. In addition, power to the BCU 150 may be provided from an aircraft power source 72, such as a DC power source within the aircraft 100. In various embodiments, power is transmitted from the aircraft power source 72 to the BCU 150.

In various embodiments of the braking system, the BCU 150 receives one or more brake commands signals 14. Brake command signal 14 may be received from a lever, pedal, switch, or any other suitable device configured for sending a brake command signal to BCU 150. For example, brake command signal 14 may be received from a pedal, such as a pilot or co-pilot brake pedal. Brake command signal 14 may comprise a plurality of signals corresponding to various brakes associated with different wheels, such as a left brake signal and a right brake signal for example. However, any suitable brake pedal configuration is within the scope of the present disclosure.

In various embodiments, the braking system 10 further comprises a plurality of wheel/brake assemblies, each wheel assembly including one or more wheels and brake stacks. For example, a left wheel/brake assembly 22*l* may include one or more wheels 24 and brake stacks 26, and one or more wheel speed sensors 27 that provide wheel speed information to the BCU 150 for carrying out brake control operations and brake health monitoring. Similarly, a right wheel/brake assembly 22*r* may include one or more wheels 24 and brake stacks 26, and one or more wheel speed sensors 27 that provide wheel speed information to the BCU 150 for carrying out brake control operations and brake health monitoring.

In various embodiments, the BCU 150 controls braking of the left wheel/brake assembly 22*l* and the right wheel/brake assembly 22*r*. A plurality of actuators 28 may be provided for exerting braking forces on the brake stacks 26 in order to brake the wheels 24. The right wheel/brake assembly 22*r* has a similar, mirrored configuration. BCU 150 may be configured to send brake command signals to a brake control component 70 to apply a braking force to the wheels 24 during a braking maneuver. In the illustrated embodiment, BCU 150 sends i) a left brake command signal 44*l* to a brake control component 70 to apply a braking force to a brake stack 26 via actuators 28 of a left wheel/brake assembly 22*l*; and ii) a right brake command signal 44*r* to a brake control component 70 to apply a braking force to a brake stack 26 via actuators 28 of a right wheel/brake assembly 22*r*.

In various embodiments, the braking system 10 may be activated by the brake command signal 14 acting through the left brake command signal 44*l* and/or the right brake command signal 44*r*. Although illustrated as comprising a left brake command signal 44*l* and a right brake command signal 44*r*, the braking system 10 may utilize any number of brake command signals without departing from the scope of the present disclosure and is not intended to be limited by the illustrated embodiment. The braking system 10 may also be activated in an autobraking mode.

In various embodiments, the braking system 10 is a hydraulic braking system, wherein the brake control component 70 comprises one or more valves for controlling hydraulic pressure to actuators 28. For example, brake control component 70 may comprise one or more shutoff valves and/or one or more servo valves, such as a coil valve for example. In various embodiments, the braking system 10 is an electric braking system, wherein the brake control component 70 comprises an electromechanical actuator controller (EMAC). An EMAC may receive and interpret a brake force command and receives electrical power to then provide power to drive electromechanical actuators 28. However, the brake control component 70 may comprise any type of brake component (i.e., hydraulic, electromechanical, etc.) without departing from the scope of the present disclosure and is not intended to be limited by the illustrated embodiment.

Figure 3:
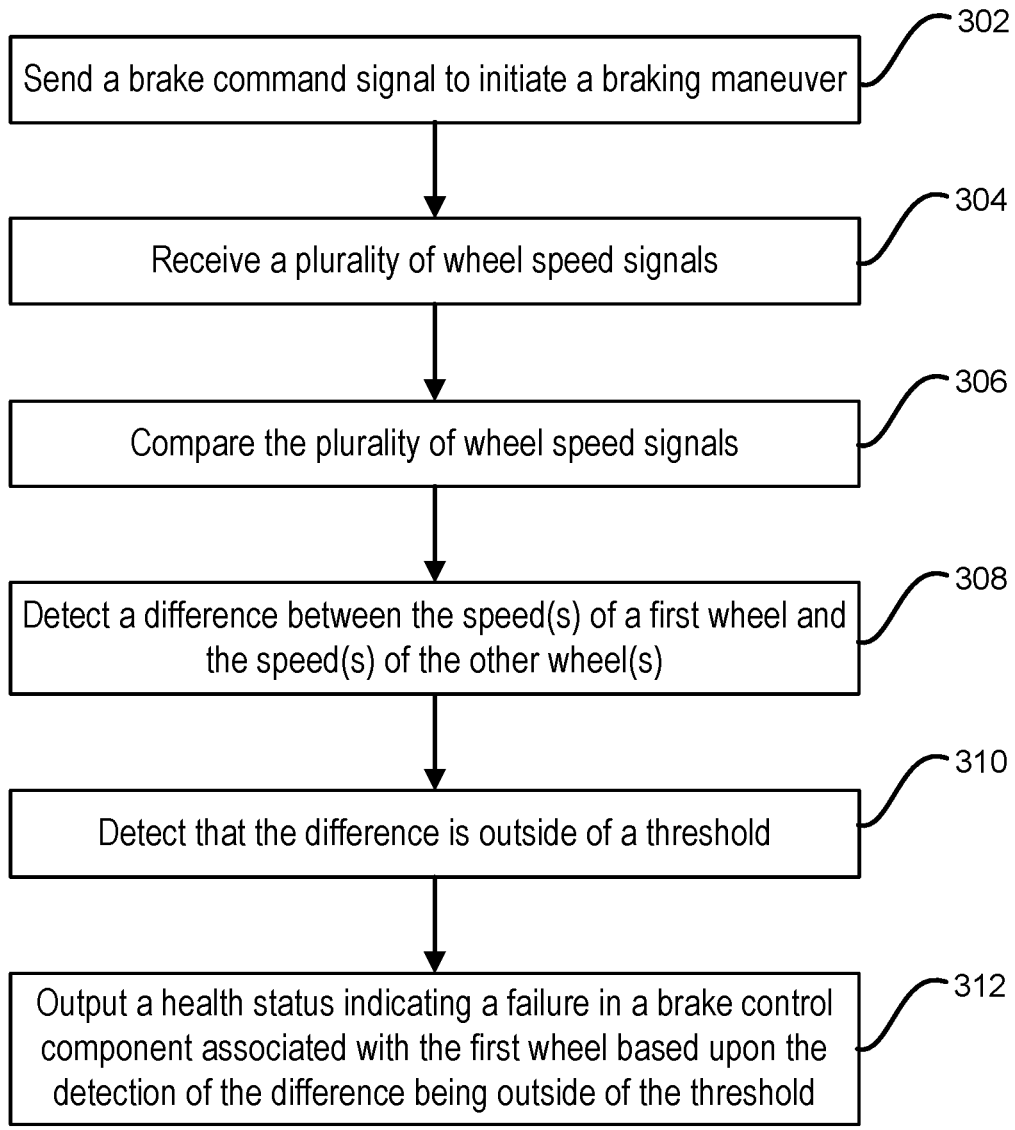
FIG. 3 illustrates a flowchart of a method for brake health monitoring, in accordance with various embodiments.

With reference to FIG. 3, a flow chart for a method 300 for brake health monitoring is illustrated, in accordance with various embodiments. Method 300 includes sending a brake command signal to initiate a braking maneuver (step 302). Method 300 includes receiving a plurality of wheel speed signals (step 304). Method 300 includes comparing the plurality of wheel speed signals (step 306). Method 300 includes detecting a difference between the speed(s) of a first wheel and the speed(s) of the other wheel(s) (step 308). Method 300 includes detecting that the difference is outside of a threshold (step 310). Method 300 includes outputting a health status indicating a failure in a brake control component associated with the first wheel based upon the detection of the difference being outside of the threshold (step 312).

With combined reference to FIG. 2 and FIG. 3, step 302 may comprise sending, by BCU 150, a brake command signal (e.g., right brake command signal 44r and/or left brake command signal 44l) to initiate a braking maneuver. During the braking maneuver, brake control component 70 may apply a braking force to brake stack 26 via actuators 28 of right wheel/brake assembly 22r and brake control component 70 may apply a braking force to brake stack 26 via actuators 28 of left wheel/brake assembly 22l. Although FIG. 2 depicts two wheel/brake assemblies, a vehicle such as an aircraft may comprise any number of left and right wheel/brake assemblies. For example, braking system 10 may comprise a second left wheel/brake assembly and a second right wheel/brake assembly that has a similar, mirrored configuration as left wheel/brake assembly 22l and right wheel/brake assembly 22r.

Step 304 may comprise receiving, by BCU 150, a first wheel speed signal from wheel speed sensor 27 (also referred to herein as a first wheel speed sensor) corresponding to a speed of a first wheel, such as wheel 24 of left wheel/brake assembly 22l, during the braking maneuver. Step 306 may comprise receiving, by BCU 150, a second wheel speed signal from wheel speed sensor 27 (also referred to herein as a second wheel speed sensor) corresponding to a speed of a second wheel, such as wheel 24 of right wheel/brake assembly 22r, during the braking maneuver. With additional reference to FIG. 4, first wheel speed signal 401 and second wheel speed signal 402 are illustrated during and after a braking event. First wheel speed signal 401 corresponds to a wheel assembly that, during the braking event, acts as a free rolling wheel due to no braking force being applied as a result of a failed brake control component. First wheel speed signal 401 may similarly correspond to a wheel assembly that, during the braking event, acts as a near free rolling wheel due to reduced or no braking force being applied as a result of a degraded or failed brake control component. Second wheel speed signal 402 corresponds to a wheel assembly that, during the braking event, receives a braking force by a properly functioning brake control component. The second wheel speed signal 402 is less than the first wheel speed signal 401 by a value or difference (indicated by arrows 405) during the braking event due to wheel slip by the properly braking wheel assembly. Therefore, a failure or latent failure of a brake control component may be detected based upon the wheel speed signals. In this regard, steps 304 and 306 may comprise receiving, by BCU 150, first wheel speed signal 401 and second wheel speed signal 402, respectively.

In various embodiments, an expected slip ratio may be on the order of 10% (i.e., the properly braking wheel exhibits a wheel speed of about 90% of the free rolling wheel speed) which is measurable by wheel speed signals. As noted, a failed brake does not provide proper (if any) brake torque, and therefore the associated wheel will be essentially free rolling, thus lacking expected slip. This is illustrated in the time-series diagram of wheel speed depicted in FIG. 4.

In various embodiments, step 308 may comprise detecting, by BCU 150, a difference (e.g., difference 405) between first wheel speed signal 401 and second wheel speed signal 402. In various embodiments, step 310 comprises detecting, by BCU 150, that the speed of the first wheel (e.g., first wheel speed signal 401) is greater than the speed of the second wheel (e.g., second wheel speed signal 402) by greater than a predetermined threshold. In various embodiments, step 310 comprises detecting, by BCU 150, that the difference 405 is greater than the predetermined threshold. The predetermined threshold may be a wheel speed value or may be an error percentage or any other desired threshold depending on the particular arithmetic function used for detecting difference 405. The predetermined threshold may be a tunable parameter based upon the particular design of the braking system 10. In various embodiments, the BCU 150 may detect that the difference 405 is greater than the predetermined threshold for at least a minimum duration to prevent a false alarm in response to a brief anomaly, such as a brief skid event for example. In various embodiments, the minimum duration is on the order of milliseconds. In various embodiments, the minimum duration is on the order of seconds. However, the minimum duration may be chosen to be any suitable duration that would indicate a high likelihood of a failed brake component.

In various embodiments, the BCU 150 is configured to output a health status (e.g., to output display 74 or to an external onboard or offboard computer system) indicating a failure in a brake control component associated with the first wheel based upon the detection of the speed of the first wheel being greater than the speed of the second wheel by greater than the predetermined threshold. In various embodiments, step 312 comprises outputting, via BCU 150, a health status indicating a failure in a brake control component associated with the first wheel in response to the detected difference being outside of the predetermined threshold.

Furthermore, BCU 150 may be configured to receive wheel speed signals from a third wheel speed sensor and/or a fourth wheel speed sensor, or any number of wheel speed sensors. In this regard, method 300 may further comprise receiving, by BCU 150, a third wheel speed signal corresponding to a speed of a third wheel during the braking maneuver. For example, in response to the associated braking components functioning properly, the third wheel speed signal may be similar to second wheel speed signal 402. In this example, BCU 150 may detect that the speed of the first wheel (i.e., wheel speed signal 401) is greater than an average speed of the second wheel and the third wheel by greater than the predetermined threshold. Thus, BCU 150 may be further configured to calculate an average value of the wheel speed signals that another wheel speed signal is being compared against and determine a difference between that wheel speed signal and the average value. In this regard, BCU 150 may be configured to output the health status indicating the failure in the brake control component associated with the first wheel based upon the detection of the speed of the first wheel being greater than the average speed of the second wheel and the third wheel by greater than the predetermined threshold. Although described as using an average speed, BCU 150 may be configured to employ various known arithmetic functions to detect a free rolling, or near free rolling wheel based upon the disclosed principles.

Figure 4:
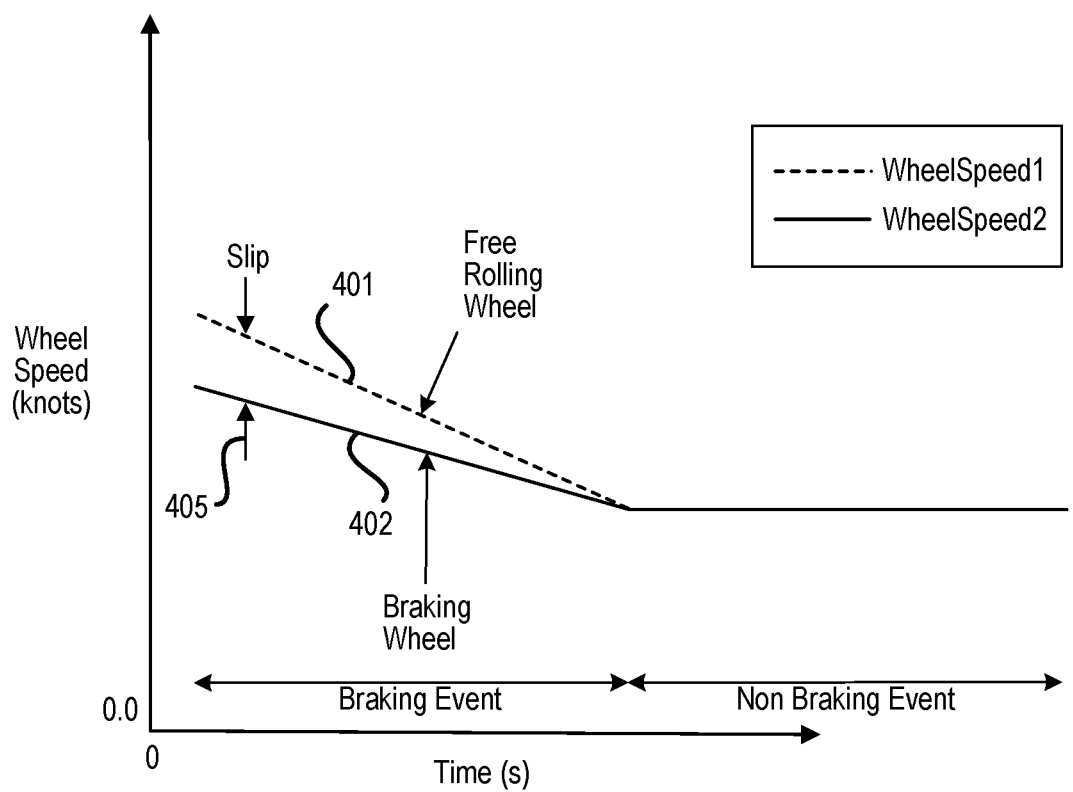
FIG. 4 illustrates a plot of a wheel speed of a free rolling wheel (e.g., due to a failed brake) and a wheel speed of a wheel having a properly functioning brake during and after a braking maneuver, in accordance with various embodiments.

In various embodiments, BCU 150 may be further configured to calculate a deceleration value (i.e., the slope of first wheel speed signal 401) of the wheel speed signals. As illustrated in FIG. 4, a slope of first wheel speed signal 401 may be greater than a slope of the second wheel speed signal 402 during the braking maneuver. BCU 150 may be configured to indicate a failure in the brake control component associated with the first wheel based upon the detection of the deceleration of the first wheel being greater than the deceleration of the second wheel and/or the third wheel by a predetermined threshold. Furthermore, and similar to the wheel speed values, the BCU 150 may average the deceleration values across a pre-determined duration and compare the average deceleration values. BCU 150 may use deceleration comparisons in addition to wheel speed comparisons for added robustness or deceleration comparisons and wheel speed comparisons may be used independently.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one, and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B, and C may be present in a single embodiment; for example, A and B, A and C, B and C, or A and B and C. Different cross-hatching is used throughout the figures to denote different parts, but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are only illustrated in the figures to help to improve understanding of embodiments of the present, representative disclosure.

Any reference to attached, fixed, connected, or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas, but not necessarily to denote the same or different materials. In some cases, reference coordinates may be specific to each figure.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements, but it may also include other elements not expressly listed or inherent to such process, method, article, or apparatus.

What is claimed is:

1. A method for brake health monitoring, comprising:
    sending, by a brake control unit (BCU), a brake command signal to initiate a braking maneuver;
    receiving, by the BCU, a first wheel speed signal corresponding to a speed of a first wheel during the braking maneuver;
    receiving, by the BCU, a second wheel speed signal corresponding to a speed of a second wheel during the braking maneuver; and
    detecting, by the BCU, that the speed of the first wheel is greater than the speed of the second wheel by greater than a predetermined threshold;
    wherein the BCU is configured to output a health status indicating a failure in a brake control component associated with the first wheel based upon detection of the speed of the first wheel being greater than the speed of the second wheel by greater than the predetermined threshold.

2. The method of claim 1, wherein the first wheel speed signal is received from a first wheel speed sensor associated with the first wheel and the second wheel speed signal is received from a second wheel speed sensor associated with the second wheel.

3. The method of claim 1, further comprising:
receiving, by the BCU, a third wheel speed signal corresponding to a speed of a third wheel during the braking maneuver; and
detecting, by the BCU, that the speed of the first wheel is greater than an average speed of the second wheel and the third wheel by greater than the predetermined threshold.

4. The method of claim 3, wherein the BCU is configured to output the health status indicating the failure in the brake control component associated with the first wheel based upon detection of the speed of the first wheel being greater than the average speed of the second wheel and the third wheel by greater than the predetermined threshold.

5. The method of claim 1, wherein the BCU is further configured to compare a first deceleration of the first wheel with a second deceleration of the second wheel.

6. The method of claim 5, wherein the BCU is configured to output the health status indicating the failure in the brake control component associated with the first wheel in response to the deceleration of the first wheel being greater than the deceleration of the second wheel by a second predetermined threshold.

7. The method of claim 1, wherein the speed of the first wheel comprises a first average speed of the first wheel and the speed of the second wheel comprises a second average speed of the second wheel.

8. A brake health monitoring system, comprising:
a brake control unit (BCU) having a processor; and
a tangible, non-transitory memory configured to communicate with the processor, the tangible, non-transitory memory having instructions stored thereon that, in response to execution by the processor, cause the BCU to perform operations comprising:
sending, by the BCU, a brake command signal to initiate a braking maneuver;
receiving, by the BCU, a first wheel speed signal corresponding to a speed of a first wheel during the braking maneuver;
receiving, by the BCU, a second wheel speed signal corresponding to a speed of a second wheel during the braking maneuver; and
detecting, by the BCU, that the speed of the first wheel is greater than the speed of the second wheel by greater than a predetermined threshold;
wherein the BCU is configured to output a health status indicating a failure in a brake control component associated with the first wheel based upon detection of the speed of the first wheel being greater than the speed of the second wheel by greater than the predetermined threshold.

9. The brake health monitoring system of claim 8, wherein the instructions cause the BCU to perform further operations comprising:
receiving, by the BCU, a third wheel speed signal corresponding to a speed of a third wheel during the braking maneuver; and
detecting, by the BCU, that the speed of the first wheel is greater than an average speed of the second wheel and the third wheel by greater than the predetermined threshold.

10. The brake health monitoring system of claim 9, wherein the BCU is configured to output the health status indicating the failure in the brake control component associated with the first wheel based upon detection of the speed of the first wheel being greater than the average speed of the second wheel and the third wheel by greater than the predetermined threshold.

11. The brake health monitoring system of claim 8, wherein the first wheel speed signal is received from a first wheel speed sensor associated with the first wheel and the second wheel speed signal is received from a second wheel speed sensor associated with the second wheel.

12. The brake health monitoring system of claim 8, wherein the BCU is further configured to compare a first deceleration of the first wheel with a second deceleration of the second wheel.

13. The brake health monitoring system of claim 12, wherein the BCU is configured to output the health status indicating the failure in the brake control component associated with the first wheel in response to the deceleration of the first wheel being greater than the deceleration of the second wheel by a second predetermined threshold.

14. The brake health monitoring system of claim 8, wherein the speed of the first wheel comprises a first average speed of the first wheel and the speed of the second wheel comprises a second average speed of the second wheel.

15. A brake health monitoring system, comprising:
a brake control unit (BCU);
a first wheel speed sensor in electronic communication with the BCU, the first wheel speed sensor configured to detect a first wheel speed corresponding to a first wheel;
a second wheel speed sensor in electronic communication with the BCU, the second wheel speed sensor configured to detect a second wheel speed corresponding to a second wheel;
wherein the BCU is configured to detect a difference between the first wheel speed and the second wheel speed, and output a health status indicating a failure in a brake control component associated with the first wheel in response to the difference being greater than a predetermined threshold.

16. The brake health monitoring system of claim 15, wherein the BCU is further configured to compare a first deceleration of the first wheel with a second deceleration of the second wheel.

17. The brake health monitoring system of claim 16, wherein the deceleration of the first wheel comprises a first average deceleration of the first wheel and the deceleration of the second wheel speed comprises a second average deceleration of the second wheel.

18. The brake health monitoring system of claim 16, wherein the BCU is configured to output the health status indicating the failure in the brake control component associated with the first wheel in response to the deceleration of the first wheel being greater than the deceleration of the second wheel by a second predetermined threshold.

19. The brake health monitoring system of claim 15, wherein the first wheel speed comprises a first average speed of the first wheel and the second wheel speed comprises a second average speed of the second wheel.

20. The brake health monitoring system of claim 15, wherein the first wheel speed and the second wheel speed are measured during a braking maneuver.

* * * * *